United States Patent
Lull et al.

(10) Patent No.: US 10,544,688 B2
(45) Date of Patent: Jan. 28, 2020

(54) MECHANICAL REINFORCEMENT FOR A PART MADE OF COMPOSITE MATERIAL, IN PARTICULAR FOR A WIND TURBINE BLADE OF LARGE DIMENSIONS

(75) Inventors: Stephane Lull, Hourtin (FR); Denis Ferrer, Vertheuil (FR); Jose Portoles, Queyrac (FR)

(73) Assignee: EPSILON COMPOSITE, Gaillan en Medoc (FR)

( * ) Notice: Subject to any disclaimer, the term of this patent is extended or adjusted under 35 U.S.C. 154(b) by 546 days.

(21) Appl. No.: 14/004,657

(22) PCT Filed: Mar. 9, 2012

(86) PCT No.: PCT/FR2012/050497
§ 371 (c)(1),
(2), (4) Date: Sep. 11, 2013

(87) PCT Pub. No.: WO2012/123667
PCT Pub. Date: Sep. 20, 2012

(65) Prior Publication Data
US 2014/0003956 A1    Jan. 2, 2014

(30) Foreign Application Priority Data

Mar. 11, 2011 (FR) ..................... 11 52013

(51) Int. Cl.
*F01D 5/28* (2006.01)
*F03D 80/00* (2016.01)

(52) U.S. Cl.
CPC ............. *F01D 5/282* (2013.01); *F03D 80/00* (2016.05)

(58) Field of Classification Search
CPC .................. F05B 2280/6003; F03D 1/065
See application file for complete search history.

(56) References Cited

U.S. PATENT DOCUMENTS

| | | | | |
|---|---|---|---|---|
| 5,916,682 A | * | 6/1999 | Horii | B32B 5/26 428/408 |
| 6,228,473 B1 | * | 5/2001 | Takemura | B29C 70/40 428/295.1 |

(Continued)

FOREIGN PATENT DOCUMENTS

| | | |
|---|---|---|
| EP | 2 283 995 A1 | 2/2011 |
| EP | 2 341 239 A2 | 7/2011 |

(Continued)

OTHER PUBLICATIONS

International Search Report dated Oct. 17, 2012, corresponding to PCT/FR2012/050497.

(Continued)

*Primary Examiner* — Kenneth Bomberg
*Assistant Examiner* — Michael L Sehn
(74) *Attorney, Agent, or Firm* — Brinks Gilson & Lione

(57) ABSTRACT

The invention relates to a reinforcement, containing fibers and resin, for an element made of a composite material, particularly a wind turbine blade, characterized in that said reinforcement is produced by stacking at least two parts produced by pultrusion. A reinforcement, containing fibers and resin, for an element made of a composite material, particularly a wind turbine blade, is characterized in that the reinforcement is produced by stacking at least two parts produced by pultrusion.

1 Claim, 3 Drawing Sheets

(56) References Cited

U.S. PATENT DOCUMENTS

Figure 1:
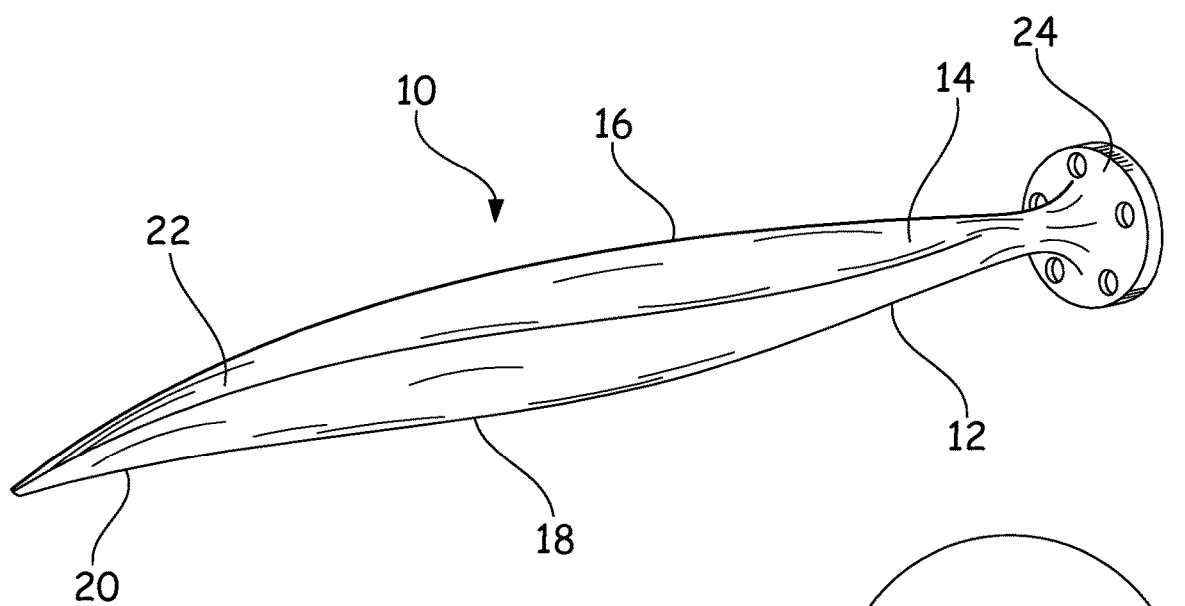

| | | | | |
|---|---|---|---|---|
| 7,198,471 | B2* | 4/2007 | Gunneskov | F03D 1/065 416/229 R |
| 2008/0277053 | A1* | 11/2008 | Stiesdal | B29C 70/342 156/245 |
| 2009/0220747 | A1 | 9/2009 | Karem | |
| 2010/0143713 | A1* | 6/2010 | Ise | D01F 6/18 428/367 |
| 2011/0135486 | A1* | 6/2011 | Bendel | B29C 70/226 416/230 |
| 2011/0211971 | A1* | 9/2011 | Bendel | F03D 1/0675 416/241 R |

FOREIGN PATENT DOCUMENTS

| | | | |
|---|---|---|---|
| GB | 2 451 192 A | | 1/2009 |
| JP | 2002-357176 | † | 12/2002 |
| JP | 2007-92716 | † | 4/2007 |
| JP | 2008-528875 | † | 7/2008 |
| JP | 2011-38520 A | | 2/2011 |
| WO | 2006/002621 A1 | | 1/2006 |
| WO | WO 2006/015598 A1 | | 2/2006 |
| WO | 2006/082479 A1 | | 8/2006 |
| WO | 2009/059304 A1 | | 5/2009 |
| WO | 2010/065928 A1 | | 6/2010 |
| WO | WO 2010/065928 | † | 6/2010 |
| WO | 2012/013192 A1 | | 2/2012 |

OTHER PUBLICATIONS

Griffin, D., et al., "Alternative Composite Materials for Megawatt-Scale Wind Turbine Blades: Design Considerations and Recommended Testing," Journal of Solar Energy Engineering, vol. 125, Nov. 2003, pp. 515-521.

"Composites: A Profile of the Worldwide Reinforced Plastics Industry," Reinforced Plastics Magazine, 2005, 4 pages.

"Wind Blade Composites Market Grows as Offshore Wind Energy Advances," AMI Conferences, Jan. 2012, 3 pages.

"Torayca T600S Data Sheet," Technical Data Sheet No. CFA-004, Toray Carbon Fibers America, Inc., 2 pages.

"Torayca T300 Data Sheet," Technical Data Sheet No. CFR-001, Toray Carbon Fibers America, Inc., 2 pages.

Bundy, B., "Use of Pultruded Carbon Fiber / Epoxy Inserts as Reinforcement in Composite Structures," thesis submitted in Montana State University, Dec. 2005, pp. 1-325.

Mandell, J. F., et al., "Fatigue of Composite Materials and Substructures for Wind Turbine Blades," Sandia Contractors Report, pp. 1-282.

Meyer, R., "Pultrusion Part Design—FRP Mechanical Property Design Criteria," Handbook of Pultrusion Technology, 1985, pp. 13-27.

Avery, D., "Compression Strength of Carbon Fiber Laminates Containing Flaws with Fiber Waviness," 42nd AIAA Aerospace Sciences Meeting and Exhibit, 2004, pp. 1-10.

"*Fundamentals of Aerodynamics, Fourth Edition*", John D. Anderson, Jr., McGraw Hill, © 2007; ISBN 007-125408-0 (3 pages).

Grounds of Appeal dated Aug. 28, 2019 regarding related European Patent No. 2497945 (Appellant: Vestas Wind Systems A/S) 44 pages.

EUROCOMP Design Code and Handbook, "Structural Design of Polymer Composites", First Edition in 1996, published by Halcrow Polymeric Ltd. ("EUROCOMP"), pp. 188, 189, and 568.†

\* cited by examiner
† cited by third party

MECHANICAL REINFORCEMENT FOR A PART MADE OF COMPOSITE MATERIAL, IN PARTICULAR FOR A WIND TURBINE BLADE OF LARGE DIMENSIONS

This application is a national filing of Parent Cooperation Treaty Application No. PCT/FR2012/050497, filed on Mar. 9, 2012, which claims priority under 35 U.S.C. § 119(a) to French Patent Application No. 11 52013, filed on Mar. 11, 2011.

This invention relates to a mechanical reinforcement for a part made of composite material, in particular a wind turbine blade of large dimensions.

Wind turbines are known that consist of a mast fixed to the ground for the land-based fields or fixed to the sea floor for offshore fields, with this mast or pylon supporting an electric generator whose shaft carries blades having a profile that is suitable for being driven by the wind.

The wind turbines are a clean and indefinitely renewable means for producing electrical energy.

Nevertheless, although advantageous on the ecological plane, these means for producing electrical energy have an essential drawback that is linked to their limited yield.

Actually, the dimensions are limited by the mechanical stresses undergone by the blades and by the mechanical strength of the blades, with the range of operation linked to wind speeds thus being deduced from these parameters and therefore relatively limited.

It is noted consequently that either the dimensions of the blades are reduced and the acceptable speeds are fairly high or the dimensions of the blades are large and the operating ranges are reduced. In this latter case, too low a wind speed does not entrain the blades because of inertia, and too high a wind speed induces stresses that exceed the mechanical strength limits that are acceptable for the blades.

The research therefore relates to means making it possible to increase all of these inherently linked parameters that therefore all pass through an increase in the mechanical strength of the blades.

The problem is that the increase in the strength by a simple increase of the wall thicknesses of the blades made of composite material also increases the weight of the blade and increases the inertia, which in addition is not satisfactory in terms of the cost that is increased and because of the fact that there will be more material to recycle at the end of the service life.

By the same token, this creates the necessity of reinforcing the mast or pylon that supports the generator.

In addition, the desired mechanical reinforcement of the blade is primarily located at the level of the flexural strength; therefore, increasing the thickness of the wall of the blade is only a partial answer.

The selection of materials has settled on carbon or on other fibers of the family of aramids because of their high inherent mechanical strength, but this is not sufficient to attain the desired result.

Thus, consideration has been given to resorting to the installation of spars that are directly integrated into the manufacture of the half-blades.

These spars are produced from integrated monolithic parts or with pre-impregnated fabrics, attached during manufacturing.

Stresses in terms of compression obtained respectively with carbon fabrics and with pre-impregnated fabrics are located within ranges of 600 to 800 MPa and 900 to 1,100 MPa.

It is known that the pultruded shapes make it possible to attain much higher strengths on the order of 1,600 MPa.

In contrast, the pultruded shapes have constant dimensions upon leaving the manufacturing plant and have a cross-section that is also constant.

The object of this invention is to resort to such pultruded shapes that act as reinforcements, in particular in wind turbine blades.

These shapes have the advantage of being able to be produced in a particularly industrial way with certain manufacturing qualities and therefore a reproducible, controlled and controllable homogeneous performance.

The reinforcement according to the invention is now described in detail according to two embodiments that make it possible to generalize the scope of the invention and to show all of its potentialities.

Figure 2:
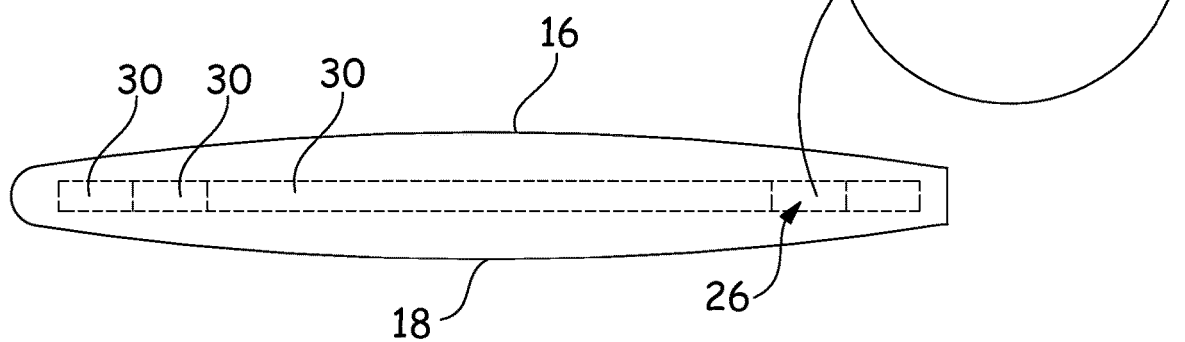

The invention is now described in detail by referring to the following drawings in which the figures show:

FIG. 1: A diagrammatic view of a wind turbine blade,

FIG. 2: A view of a wind turbine blade with a reinforcement according to the invention whose mounting points on the soffit and on the extrados are shown in a diagram, and in the magnified area a detail of a transverse cutaway, FIG. 3: A perspective view of a reinforcement according to the invention that is ready to be integrated during the manufacture of a wind turbine blade, FIG. 4: A view before and after machining, making it possible to reduce the end stresses.

Figure 5:
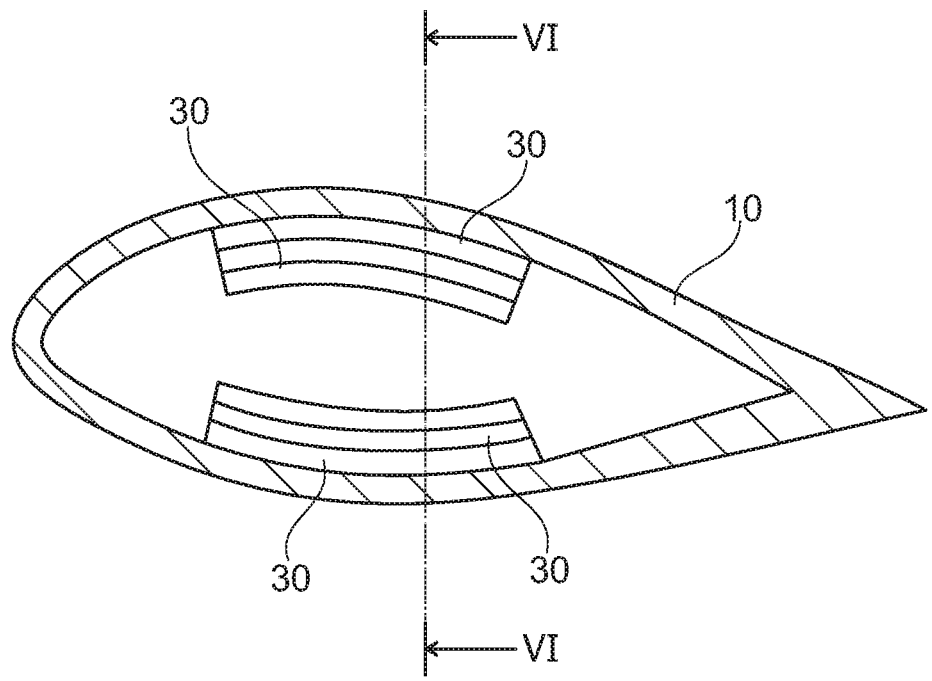
Figure 6:
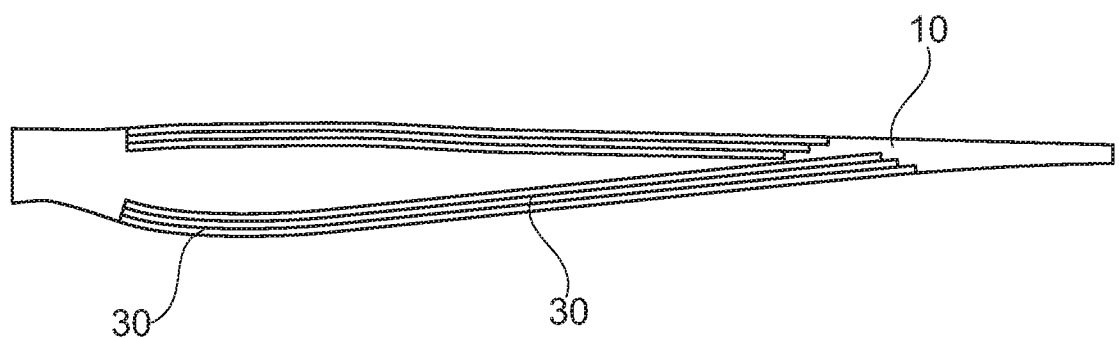

FIG. 5: A view of the blade and parts where the deformation of the parts is shown, and FIG. 6: A cross-sectional view of FIG. 5.

Figure 3:
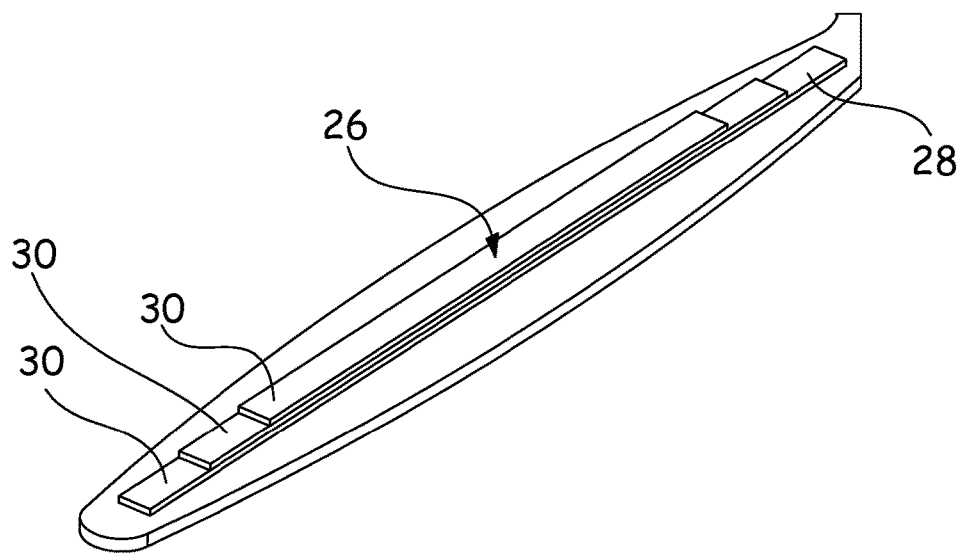

The invention is now described relative to FIG. 1, 2 or 3 interchangeably.

FIG. 1 shows, in a diagrammatic way, a blade 10 of a wind turbine rotor, itself not shown, which generally comprises three of them.

This type of blade is made by the molding of two half-blades 12, 14, lower and upper, which are then assembled according to an essentially median attachment plane.

The profile of a wind turbine blade is of the wing type such as an aircraft wing with a leading edge 16, a trailing edge 18, a soffit 20, and an extrados 22.

The blade 10 comprises a blade foot 24 designed to be attached by a flange on said rotor, generally by bolting.

The body of each half-blade is manufactured in a known way by draping masts of fibers or fabrics embedded in a resin matrix. The greatly stressed parts undergo an increase in the material thickness.

Actually, the complex shape and the dimensions make it difficult to resort to honeycomb-type alveolar materials that would have the advantage of being very strong and very light.

This invention proposes adding—during the manufacture, for example, or a posteriori—at least one reinforcement 26 that acts as a spar, on each side of the blade and therefore within each half-blade, as shown in FIG. 2, essentially along the longitudinal axis.

Such a reinforcement is to have a shape that is adapted to the stresses undergone by the blade and is therefore to have a variable thickness.

Furthermore, it is known that there is a technology for manufacturing parts made of composite material with very high performance, generally produced from carbon fibers that can develop resistances to compression beyond 1,600 MPa: this is pultrusion.

This technology makes it possible to produce parts with a constant cross-section, of a simple profile, in particular with a round, square, or rectangular cross-section.

The quality of production, reproducibility and performance are exceptional.

Thus, it is possible to produce continuously a pultruded shape 28 with a rectangular cross-section. To provide an example, such a shape has a width that is much larger than its thickness: 500 mm of width for a thickness of 1 to 2 mm.

This shape is cut by mechanical cutting to the length required for making parts 30, in this case sheet-shaped parts 30.

There are then two options—either the preliminary manufacturing of the reinforcement 26 according to the invention or the manufacture of the in-situ reinforcement 26—on the manufacturing site of the blade.

In the two cases, the series of production steps is identical. Actually, it is advisable to superpose at least two thus-produced sheet-shaped parts 30 and to make them integral by bonding in such a way as to obtain a structure of the glued laminate type forming the reinforcement 26.

Advantageously, the length of the sheets is variable, which makes it possible to adjust the thickness of the reinforcement based on zones that require an increase of the mechanical strength properties and to obtain the desired progressiveness.

The thickness, still in the example that is provided in a nonlimiting way, can generate a thickness of 40 to 50 mm in the most reinforced part, resulting from the superposition of several tens of sheets.

In particular, the flexural strength of the wind turbine blade and the distribution profile of this strength are thus controlled.

In addition, the stresses on the soffit are different from those on the extrados, although the corresponding reinforcements are also different.

The weight of the final blade is decreased because of the integration of this high-modulus reinforcement according to the invention, thus leading to improved performance as well as to working ranges of higher amplitude.

It is also noted that the reinforcement according to this invention consists of sheets that are deformable as a unit, without a significant stress. This allows a shape of each sheet for following the curvilinear profile of the blades, an example shown in FIGS. 5 and 6. Once shaped and linked to one another by bonding in particular, the reinforcement that is obtained is therefore shaped and has a high stiffness, variable along the blade.

It is noted that the shape of very slight thickness can be delivered on a spool, which greatly facilitates the industrial manufacturing of the blade. Actually, the pultruded shapes are wound and delivered in long lengths that have to be cut to produce the assemblies by superposition of several tens of sheets.

Figure 4:
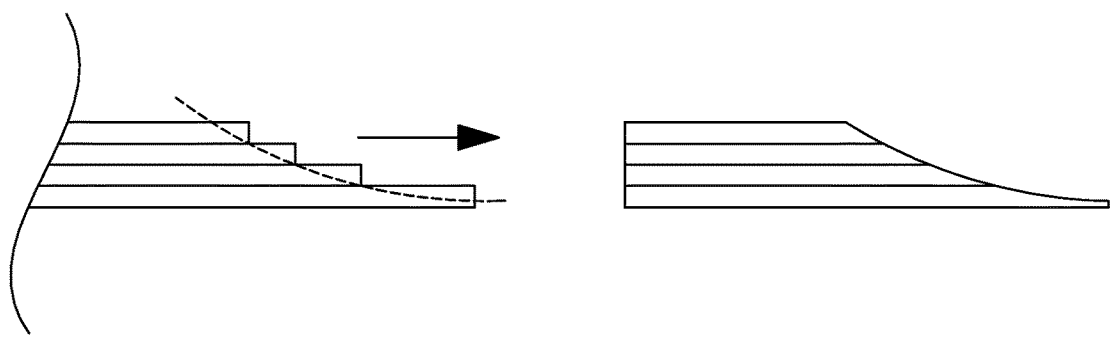

FIG. 4 shows an improvement of the embodiment of such parts by superposition of sheets. The ends are again located with a superposition of the offset thicknesses forming stair steps. So as to combat the concentration of stresses and to limit the risks of delamination, it is possible to initiate a curved machining, as shown on the right of FIG. 4, thus eliminating the stairs.

Of course, as a variant, the cross-section of the shape obtained by pultrusion could be triangular with triangular rods juxtaposed laterally without exceeding the scope of the invention.

These rods would then be introduced directly or sandwiched between two skins of pultruded sheets with a rectangular cross-section, for example for forming a suitable reinforcement.

The sheets have a rectangular cross-section, but the transverse cross-section can also be curved to take into account the shape of the blade in the zone where said reinforcement is arranged.

In addition, as the pultrusion allows, the fibers are arranged in a suitable way with, in particular, unidirectional fibers for increasing the longitudinal rigidity and fibers oriented for ensuring the absorption of stresses from compound twisting and/or bending.

The nature of the fibers used is rather industrial with high performance of carbon, but the reinforcement according to this invention can be used with glass fibers as well.

Likewise, in the example that is adopted, sheets of identical width are provided, but it is also possible to provide a superposition of sheets of gradually decreasing length and width, for example, and/or variable thicknesses.

Also, if the necessary width is greater than the extrudable width, it is possible to juxtapose laterally several units each with a superposition of sheets.

The invention claimed is:

1. A method for forming a reinforcement for a wind turbine blade, comprising:
    pultruding a composite material that combines fibers and resin into a plurality of sheet-shaped parts defined by a width, a thickness, and a length defined by a longitudinal distance between opposite free ends, the thickness being of a smaller dimension than both the width and the length;
    forming the sheet-shaped parts transversally and longitudinally to take into account a shape of a profile of the element that receives the at least two parts in such a way as to form a pre-stressed reinforcement composed of said at least two parts and adapted to the profile of the element; and
    wherein the forming the sheet-shaped parts further comprises forming the sheet-shaped parts into a stack, where each sheet-shaped part is superposed upon and fused to another sheet-shaped part, wherein such pre-stressed reinforcement is deformed longitudinally and transversely to stresses undergone by a shape and curvilinear profile.

* * * * *